No. 784,399. Patented March 7, 1905.

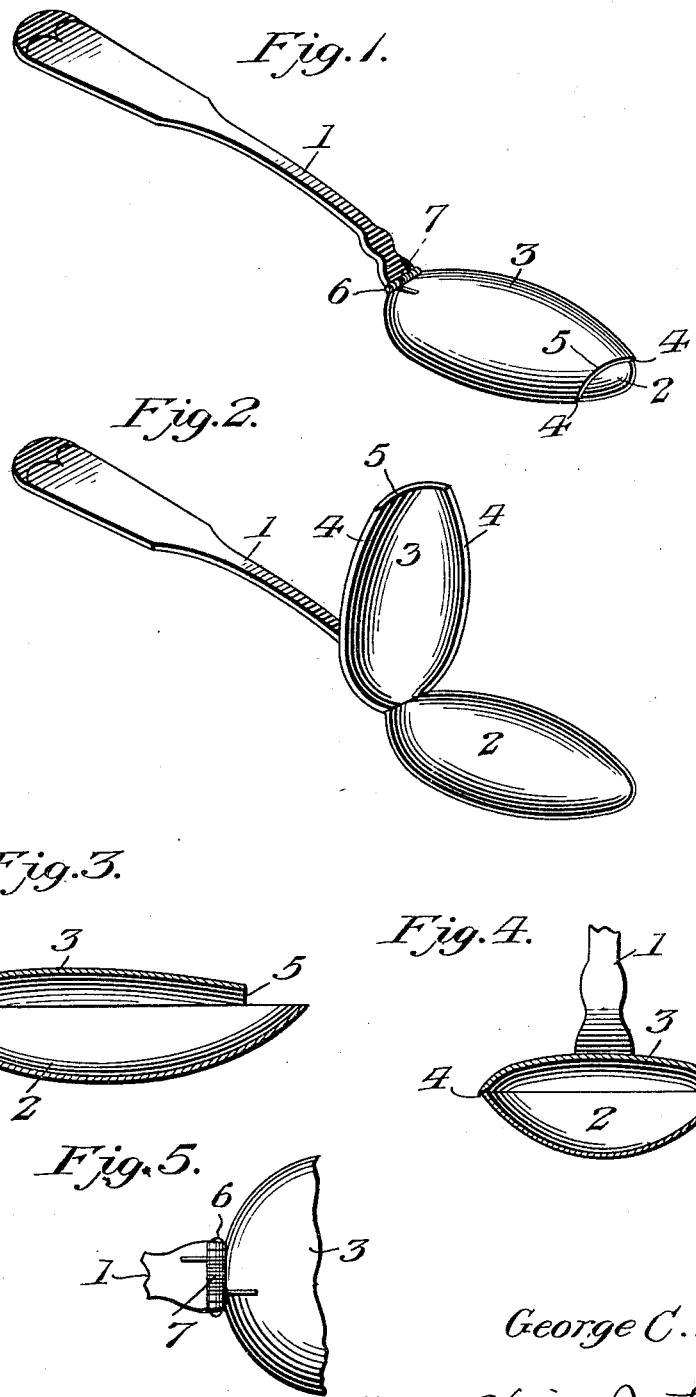

UNITED STATES PATENT OFFICE.

GEORGE C. HOHEIN, OF NORFOLK, VIRGINIA.

MEDICINE-SPOON.

SPECIFICATION forming part of Letters Patent No. 784,399, dated March 7, 1905.

Application filed August 20, 1904. Serial No. 221,535.

*To all whom it may concern:*

Be it known that I, GEORGE C. HOHEIN, a citizen of the United States, residing at Norfolk, in the county of Norfolk and State of Virginia, have invented new and useful Improvements in Medicine-Spoons, of which the following is a specification.

My invention has relation to improvements in medicine-spoons; and the object is to improve and simplify the prior art by providing a spoon of the kind named and for the purposes intended which may be readily manipulated, which will retain the contents without liability of wasting, and which may be conveniently kept clean and in sanitary condition.

The invention resides in the improved article of manufacture hereinafter described and as illustrated in the annexed drawings.

Referring to the annexed drawings, Figure 1 is a perspective view of the complete spoon, showing it as in closed condition. Fig. 2 is a perspective view showing the cover as in raised position. Fig. 3 is a longitudinal central sectional view through the parts comprising the spoon. Fig. 4 is a transverse section of the spoon and cover. Fig. 5 is a detail perspective view showing the torsional spring which secures the cover down on the bowl of the spoon.

In the drawings the same parts appearing in different illustrations are designated by like reference notations.

Referring to the drawings, 1 designates the handle of the spoon, and 2 designates the bowl thereof. These parts may be of such size and capacity as desired and of course made of such material as will be non-corrodible and hygienic and sanitary. The spoons will be made of different sizes, so as to hold the prescribed dose to be administered.

3 designates the cover of the bowl of the spoon, consisting of a convexo-concave piece of metal having the edge contour of that of the bowl and formed with a suitable bead or small flange along its inner edge, as 4, which locks down over the edge of the bowl in the same way as the case of a watch snaps down on the case-ring, and thus the cover is held to the bowl by frictional contact. The end of the cover is cut off, as seen in the drawings at 5, to provide an opening through which the contents are discharged when administering the medicine to the patient.

The cover is pivotally hinged to the base of the handle, as seen at 6, the hinge being provided with a torsional spring 7, the arms of which bear on the handle and on the cover, as shown in Fig. 5 of the drawings, whereby the cover is held secure against accidental displacement.

To supply the spoon with the dose, the cover is turned up, as seen in Fig. 2 of the drawings, and the medicine poured in as usual, or the cover may remain fast or closed, as seen in Fig. 1, and the medicine poured into the bowl through the opening.

It will be perceived that the spoon can be readily cleaned and its sanitary condition thus preserved. Since the cover and the bowl are sealed by the engagement of their edges, the spoon may be supplied with a dose of the medicine and then placed in convenient position handy for the patient, who may administer the potion when necessary.

Having thus described my invention, what I claim is—

As an improved article of manufacture, a medicine-spoon comprising a bowl, and a hingedly-mounted cover having a flange adapted to engage over the edge of the bowl to secure the cover in locked position upon the bowl.

In testimony whereof I affix my signature in presence of two witnesses.

GEORGE C. HOHEIN.

Witnesses:
P. B. WILLIAMS,
F. L. STEWART.